(12) United States Patent
Chakravarti et al.

(10) Patent No.: US 10,915,560 B2
(45) Date of Patent: Feb. 9, 2021

(54) RANKING PASSAGES BY MERGING FEATURES FROM FACTOID ANSWERS

(71) Applicant: INTERNATIONAL BUSINESS MACHINES CORPORATION, Armonk, NY (US)

(72) Inventors: Rishav Chakravarti, Mount Vernon, NY (US); James W. Murdock, Amawalk, NY (US); Jiri Navratil, Cortlandt Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 573 days.

(21) Appl. No.: 15/827,983

(22) Filed: Nov. 30, 2017

(65) Prior Publication Data
US 2019/0163812 A1    May 30, 2019

(51) Int. Cl.
*G06F 16/33* (2019.01)
*G06F 16/332* (2019.01)
(Continued)

(52) U.S. Cl.
CPC .... *G06F 16/3329* (2019.01); *G06F 16/24578* (2019.01); *G06F 16/338* (2019.01); *G06F 16/345* (2019.01)

(58) Field of Classification Search
CPC .............. G06F 16/3329; G06F 16/338; G06F 16/24578; G06F 16/382; G06F 16/345; G06N 20/00; G06N 5/00
See application file for complete search history.

(56) References Cited

U.S. PATENT DOCUMENTS

| 9,092,989 B2 | 7/2015 | Agarwal et al. |
| 9,323,831 B2 | 4/2016 | Chu-Carroll et al. |

(Continued)

OTHER PUBLICATIONS

Anonymous, et al., "Improving User Feedback in a Question Answering System for Indirect Answers", An IP.com Prior Art Database Technical Disclosure, IP.com No. IPCOM000239021D, Oct. 2014, 4 pages.

(Continued)

*Primary Examiner* — Alicia M Willoughby
(74) *Attorney, Agent, or Firm* — Tutunjian & Bitetto, P.C.; Nicole Spence (57) ABSTRACT

A method is provided that includes generating answer-passage pairs, each associated with a respective one of multiple feature vectors. The method includes, for each answer in the pairs, merging the feature vectors associated with any of the pairs that include the answer to obtain a merged answer vector. The method includes, for each passage in the pairs, (i) merging the feature vectors associated with any of the pairs that includes the passage to obtain a merged passage vector, (ii) merging the feature vectors from the merged answer vector for each answer that is associated with the passage via at least one of the pairs to obtain a merged passage-answer vector, and (iii) concatenating the merged passage vector and the merged passage-answer vector to obtain a concatenated passage vector. The method includes ranking the concatenated passage vector for each passage to obtain a ranked list of passages with associated confidence scores.

20 Claims, 6 Drawing Sheets

(51) Int. Cl.
*G06F 16/338* (2019.01)
*G06F 16/34* (2019.01)
*G06F 16/2457* (2019.01)

(56) References Cited

U.S. PATENT DOCUMENTS

| | | | |
|---|---|---|---|
| 9,507,854 B2 | 11/2016 | Brown et al. | |
| 9,720,981 B1* | 8/2017 | Boguraev | G06F 16/2423 |
| 10,019,513 B1* | 7/2018 | Koren | G06N 5/04 |
| 10,180,964 B1* | 1/2019 | Baker | G06F 16/24578 |
| 2007/0136281 A1* | 6/2007 | Li | G06F 16/313 |
| 2014/0141399 A1 | 5/2014 | Agarwal et al. | |
| 2014/0141401 A1* | 5/2014 | Agarwal | G06N 5/02 |
| | | | 434/359 |
| 2014/0297571 A1* | 10/2014 | Beamon | G06F 16/61 |
| | | | 706/12 |
| 2016/0125013 A1* | 5/2016 | Barborak | G06F 16/24578 |
| | | | 707/748 |
| 2017/0242915 A1* | 8/2017 | Torisawa | G06F 16/00 |
| 2017/0293679 A1* | 10/2017 | Boguraev | G06F 16/24522 |
| 2018/0114108 A1* | 4/2018 | Lao | G06N 5/04 |
| 2018/0365220 A1* | 12/2018 | Chakraborty | G06N 3/0454 |
| 2020/0034722 A1* | 1/2020 | Oh | G06N 5/04 |
| 2020/0134263 A1* | 4/2020 | Oh | G06N 3/08 |

OTHER PUBLICATIONS

Anonymous, et al., "A System & Method to Identify Correct Candidates for Question Answering over Structured Knowledge", An IP.com Prior Art Database Technical Disclosure, IP.com No. IPCOM000180748D, Mar. 2009, 4 pages.

Anonymous, et al., "Projection Based Scoring of Candidate Answers in a Question Answering System", An IP.com Prior Art Database Technical Disclosure, IP.com No. IPCOM000239281D, Oct. 2014, 4 pages.

Anonymous, et al., "A Self-diagnosing Question Answering System", IP.com No. IPCOM000247244D, Aug. 2016, 6 pages.

Liu, "A Phased Ranking Model for Information Systems",Language Technologies Institute School of Computer Science Carnegie Mellon University, Sep. 2016, 137 pages.

Yang et al., "Learning to Answer Biomedical Factoid & List Questions: OAQA at BioASQ 3B", CLEF, Sep. 2015, 16 pages.

* cited by examiner

RANKING PASSAGES BY MERGING FEATURES FROM FACTOID ANSWERS

BACKGROUND

Technical Field

The present invention relates generally to information processing and, in particular, to ranking passages by merging features from factoid answers.

Description of the Related Art

Question Answering (QA) is an application area of Computer Science which attempts to build software systems that can provide accurate, useful answers to questions posed by human users in natural language (e.g., English).

A QA system is a system that provides exact answers to natural language questions for some range of topics. The notion of exact in this context is ultimately a subjective measure intended to indicate that a QA system is distinguished by providing responses that contain just the information necessary to precisely answer the question intended by user.

A "factoid" question is a question that asks for a word or phrase answer, e.g., "What is the capital of New Jersey?" or "How many nuclear power plants are there in the U.S.?" or "What is the best brand of coffee?".

Some applications may wish to merely find answers to these questions. However, in many applications, a problem exists in that users want to see more than just the answer. That is, users often also want to see some text that convinces them that the answer is correct. Hence, there is a need for a solution that provides text in support of factoid answers.

SUMMARY

According to an aspect of the present invention, a computer-implemented method is provided. The method includes generating, by a processor, a plurality of answer-passage pairs, each associated with a respective one of a plurality of feature vectors. The method further includes, for each answer in the answer-passage pairs, merging, by the processor, the feature vectors associated with any of the answer-passage pairs that include the answer to obtain a merged answer vector for the answer. The method also includes, for each passage in the answer-passage pairs, (i) merging, by the processor, the feature vectors associated with any of the answer-passage pairs that includes the passage to obtain a merged passage vector for the passage, (ii) merging, by the processor, the feature vectors from the merged answer vector for each answer that is associated with the passage via at least one of the answer-passage pairs to obtain a merged passage-answer vector for the passage, and (iii) concatenating, by the processor, the merged passage vector and the merged passage-answer vector to obtain a concatenated passage vector for the passage. The method additionally includes ranking, by the processor, the concatenated passage vector for the each passage to obtain a ranked list of passages with associated confidence scores.

In this way, the passages providing the best support for an answer to a question can be identified, thus overcoming the aforementioned problem of simply providing an answer to a question, without more, when more in the form of support for the answer is desired.

In an embodiment, an answer in at least one of the answer-passage pairs can be a factoid answer to a factoid question. As such, given the brevity of an answer to a factoid question, the ranked passages provide the user with support for the answer, thus allowing the user to understand the reasoning or support for the answer as opposed to just the answer. In this way, a user's understanding of the answer is expanded beyond simply knowing the answer.

In an embodiment, a highest ranking passage from among the answer-passage pairs relates to a solution for a problem plaguing a hardware-based device, and the method further includes performing, responsive to the highest ranking passage, a curative action for the problem selected from the group consisting of activating an antivirus program, disabling a faulty component, and activating a backup component to replace the faulty component. In this way, the ranked list can be automatically exploited to go well beyond conventional question and answer systems, by not only providing support for answers in the form of supporting passages, but also in being able to automatically act upon the support to solve another problem (i.e., the aforementioned problem plaguing the hardware-based device).

According to another aspect of the present invention, a computer program product is provided. The computer program product includes a non-transitory computer readable storage medium having program instructions embodied therewith. The program instructions are executable by a computer to cause the computer to perform a method. The method includes generating, by a processor, a plurality of answer-passage pairs, each associated with a respective one of a plurality of feature vectors. The method further includes, for each answer in the answer-passage pairs, merging, by the processor, the feature vectors associated with any of the answer-passage pairs that include the answer to obtain a merged answer vector for the answer. The method also includes, for each passage in the answer-passage pairs, (i) merging, by the processor, the feature vectors associated with any of the answer-passage pairs that includes the passage to obtain a merged passage vector for the passage, (ii) merging, by the processor, the feature vectors from the merged answer vector for each answer that is associated with the passage via at least one of the answer-passage pairs to obtain a merged passage-answer vector for the passage, and (iii) concatenating, by the processor, the merged passage vector and the merged passage-answer vector to obtain a concatenated passage vector for the passage. The method additionally includes ranking, by the processor, the concatenated passage vector for the each passage to obtain a ranked list of passages with associated confidence scores.

In this way, similar to the above method, the computer program product identifies the passages providing the best support for an answer to a question, thus overcoming the aforementioned problem of simply providing an answer to a question, without more, when more in the form of support for the answer is desired.

According to yet another aspect of the present invention, a computer processing system is provided. The computer processing system includes a processor. The processor is configured to generate a plurality of answer-passage pairs, each associated with a respective one of a plurality of feature vectors. The processor is further configured to, for each answer in the answer-passage pairs, merge the feature vectors associated with any of the answer-passage pairs that include the answer to obtain a merged answer vector for the answer. The processor is also configured to, for each passage in the answer-passage pairs, (i) merge the feature vectors associated with any of the answer-passage pairs that includes the passage to obtain a merged passage vector for the passage, (ii) merge the feature vectors from the merged answer vector for each answer that is associated with the passage via at least one of the answer-passage pairs to obtain a merged passage-answer vector for the passage, and (iii) concatenate the merged passage vector and the merged passage-answer vector to obtain a concatenated passage vector for the passage. The processor is additionally configured to rank the concatenated passage vector for the each passage to obtain a ranked list of passages with associated confidence scores.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to ranking passages by merging features from factoid answers.

In an embodiment, the present invention provides a mechanism for ranking textual passages based on the degree to which they can persuade someone that a particular answer is the correct answer to a question, thus providing a solution to the aforementioned problem of a user wanting more than simply an answer to a question in the form of support for the answer. To that end, many applications, forms, and so forth have fields or other data entry structures that require more than simply an answer to a question in the form of support for the answer to the question. Advantageously, the present invention can overcome the aforementioned problem and automatically provide such support, even ranking the supporting passages so that the best supporting passage(s) can be identified.

In an embodiment of the present invention, the DeepQA architecture (or other architecture, as readily appreciated by one of ordinary skill in the art) can be used to provide both answers and supporting evidence passages for those answers, and the mechanism of the present invention can be used to rank the supporting evidence passages. Other embodiments could use other underlying QA systems to find the answers and the passages and still use the mechanism of the present invention to rank the answers and passages. These and other variations of the present invention are readily determined by one of ordinary skill in the art, given the teachings of the present invention provided herein, while maintaining the spirit of the present invention.

While the present invention is particularly useful in the case of factoid questions, it is to be appreciated that the present invention can also be applied to cases involving non-factoid questions, while maintaining the spirit of the present invention. In fact, given the teachings of the present invention provided herein, one of ordinary skill in the art will readily contemplate these and other variations of the present invention, while maintaining the spirit of the present invention.

Figure 1:
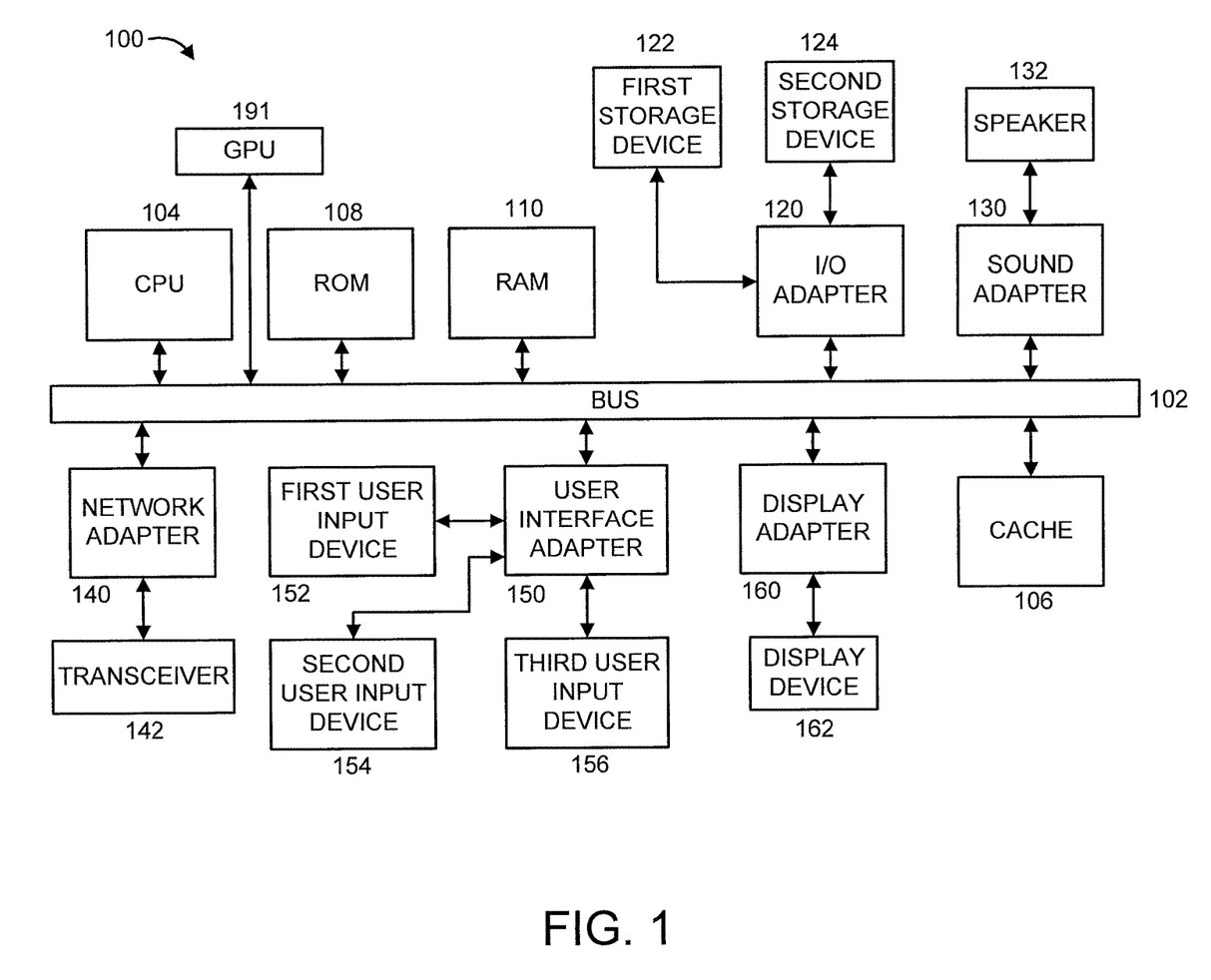
FIG. 1 shows an exemplary processing system to which the present invention may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
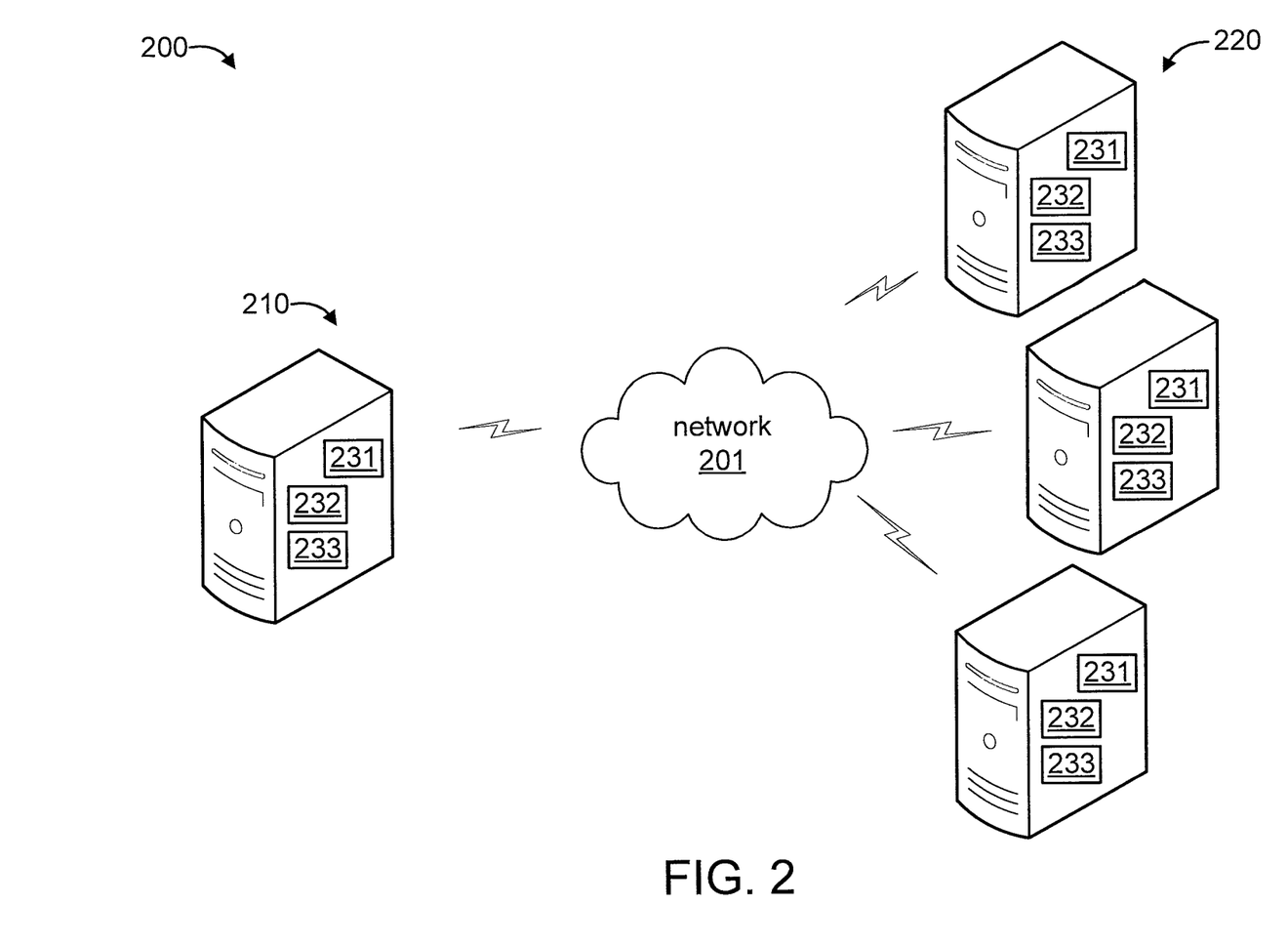
FIG. 2 shows an exemplary environment to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 3:
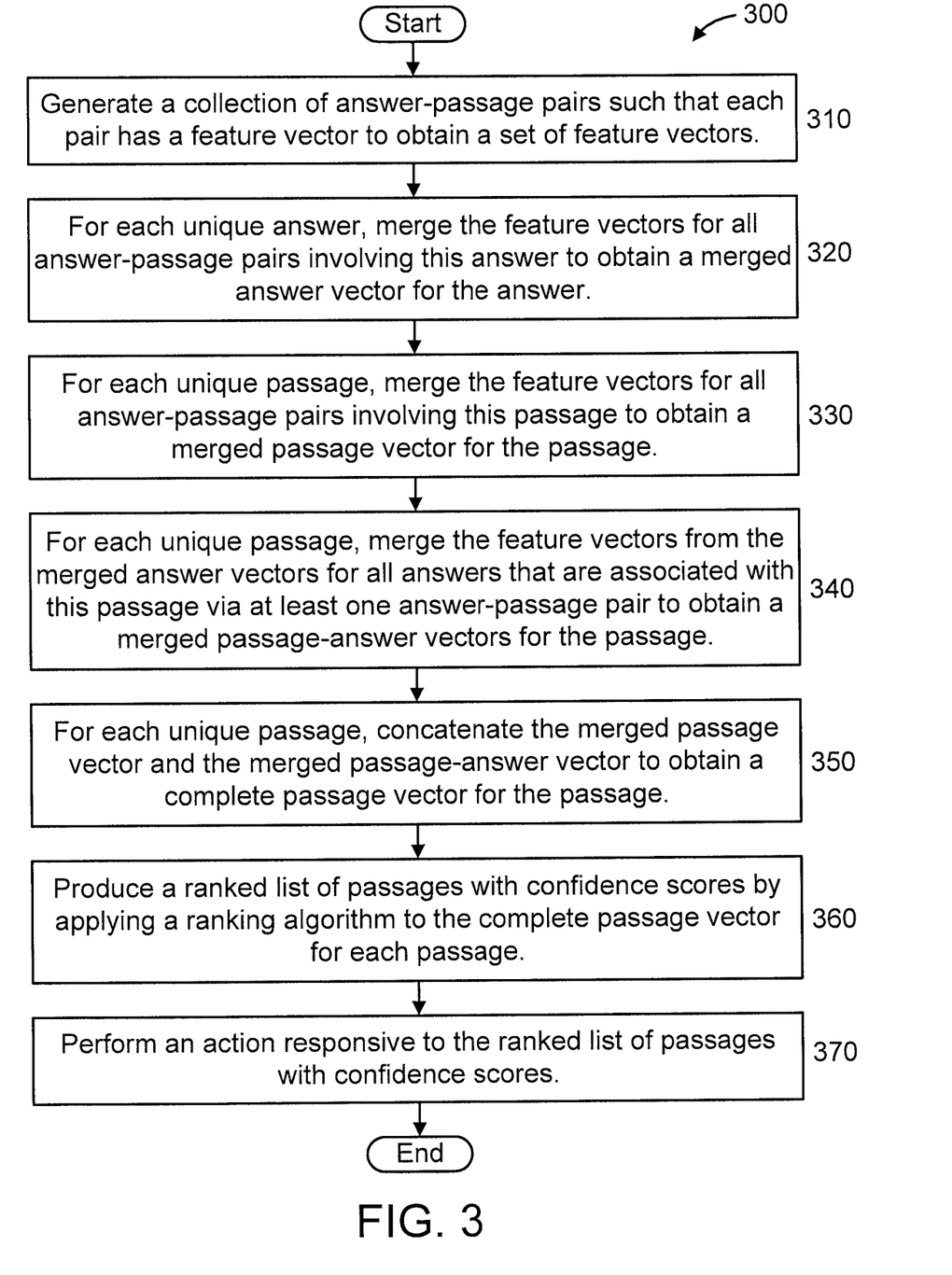
FIG. 3 shows an exemplary method for ranking passages by merging features from factoid answers, in accordance with an embodiment of the present invention.
Figure 4:
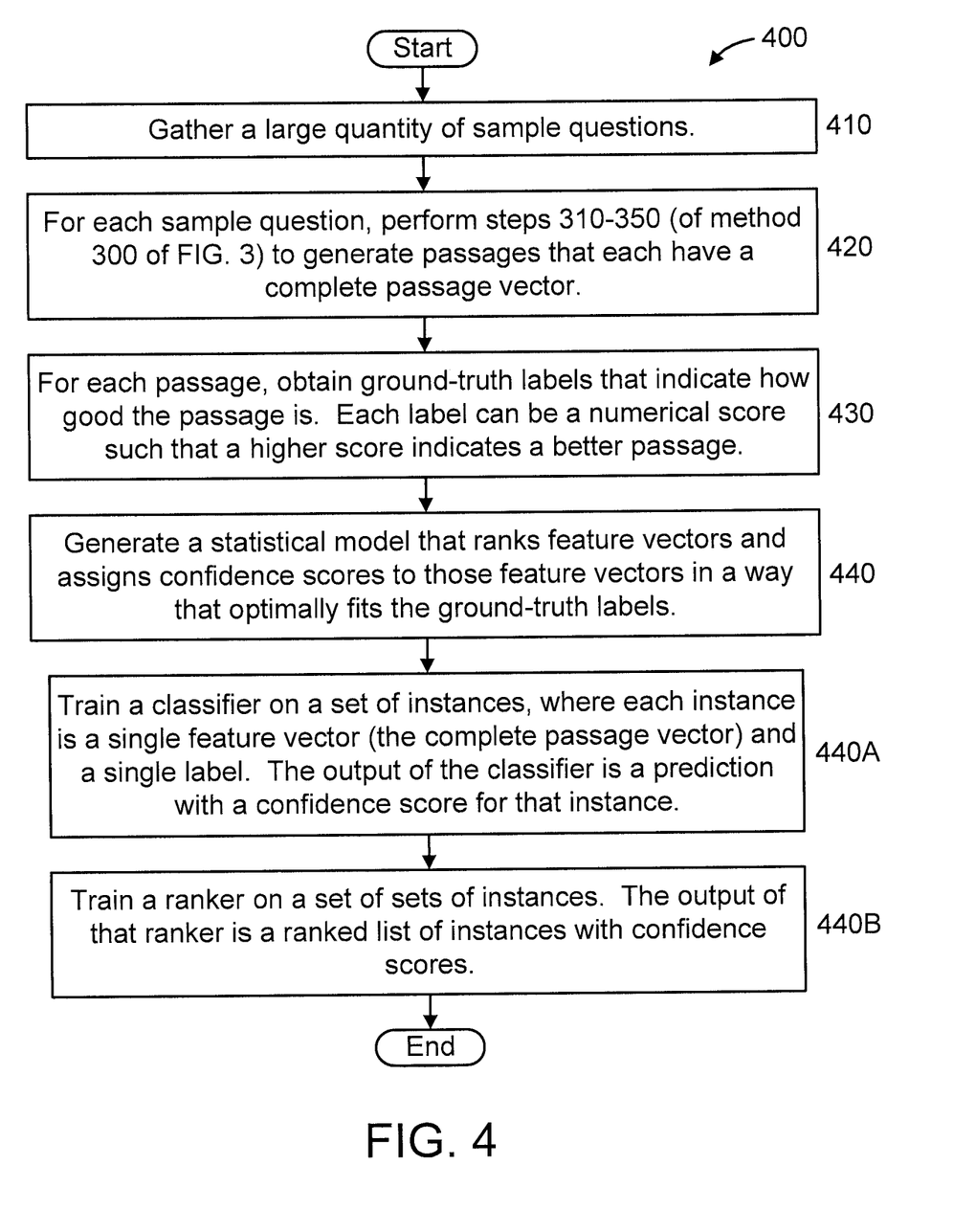
FIG. 4 shows an exemplary method for model training, in accordance with an embodiment of the present invention.

Further, it is to be appreciated that processing system 100 may perform at least part of the method described herein including, for example, at least part of method 300 of FIG. 3 and/or at least part of method 400 of FIG. 4. Similarly, part or all of environment 200 may be used to perform at least part of method 300 of FIG. 3 and/or at least part of method 400 of FIG. 4.

FIG. 2 is a block diagram showing an exemplary environment 200 to which the present invention can be applied, in accordance with an embodiment of the present invention. The environment 200 is representative of a computer network to which the present invention can be applied. The elements shown relative to FIG. 2 are set forth for the sake of illustration. However, it is to be appreciated that the present invention can be applied to other network configurations and other operational environments as readily contemplated by one of ordinary skill in the art given the teachings of the present invention provided herein, while maintaining the spirit of the present invention.

The environment 200 at least includes a computing node 210 operatively coupled to a set of computing nodes (e.g., servers, providers of services, etc.) 220.

Each of the computing node 210 and the computing nodes 220 at least include a processing element 231, a memory 232, and a communication device 233. The communication device 233 can be, for example, but is not limited to, a wireless transceiver, an Ethernet adapter, a Network Interface Card (NIC), and so forth.

The computing node 210 can receive the answer-passage pairs from one or more of the computing nodes. Moreover, the computing node 210 can receive questions corresponding to the answer-passage pairs.

The computing node 210 can process the answer-passage pairs in order to provide a ranking of passages that best support the answer to a particular question such as, for example, a factoid question. Such processing is described with respect to method 300 of FIG. 3, while training of a model that can be used to perform method 300 is described with respect to method 400 of FIG. 4. In this way, multiple passages can be ranked by the degree with which they support a particular answer to a particular question. Such support can provide valuable in many scenarios where the answer alone will not suffice. For example, many scenarios often can require a justification (support) and not just an answer. The present invention can automatically provide such support, thereby relieving a user from having to derive the same. These and other advantages of the present invention are readily determined by one of ordinary skill in the art, given the teachings of the present invention provided herein, while maintaining the spirit of the present invention.

The computing node 210 and/or any of the computing nodes 220 can be and/or otherwise include any type of computer processing system or device such as, but not limited to, servers, desktops, laptops, tablets, smart phones, media playback devices, and so forth, depending upon the particular implementation. For the sake of illustration, the computing node 210 and the computing nodes 220 are servers.

The computing node 210 can be configured to perform an action (e.g., a control action) on a controlled system, machine, and/or device responsive to a ranking list of passages (e.g., responsive to the top-ranked passage). The controlled system, machine, and/or device can be one of the computing nodes 220 or some other system, machine, and/or device.

In the embodiment shown in FIG. 2, the elements thereof are interconnected by a network(s) 201. However, in other embodiments, other types of connections can also be used. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present invention provided herein, while maintaining the spirit of the present invention.

In an embodiment, the present invention takes as input a factoid question and produces as output a ranked list of passages with confidence scores, such that passages with higher confidence scores are more likely to answer the question.

FIG. 3 shows an exemplary method 300 for ranking passages by merging features from factoid answers, in accordance with an embodiment of the present invention.

At step 310, generate a collection of answer-passage pairs such that each pair has a feature vector to obtain a set of feature vectors. It is to be noted that a feature vector is a fixed length sequence of values (which may be numbers or symbols). The values should be relevant to whether the answer is correct.

In an embodiment, step 310 can be performed using DeepQA. DeepQA is a software architecture for deep content analysis and evidence-based reasoning that uses advanced natural language processing, semantic analysis, information retrieval, automated reasoning and machine learning. DeepQA deeply analyzes natural language input to better find, synthesize, deliver and organize relevant answers and their justifications from the wealth of knowledge available in a combination of existing natural language text and databases. Of course, the present invention is not limited to DeepQA and, thus, another architectures for deep context analysis and evidence-based reasoning can also be used in accordance with the teachings of the present invention, while maintaining the spirit of the present invention.

At step 320, for each unique answer, merge the feature vectors for all answer-passage pairs involving this answer to obtain (as output) a merged answer vector for the answer. It is to be noted that to merge feature vectors, various pre-defined functions can be used. Such pre-defined functions can include, but are not limited to, component-wise (weighted) average, minimum, maximum, and so forth.

At step 330, for each unique passage, merge the feature vectors for all answer-passage pairs involving this passage to obtain (as output) a merged passage vector for the passage.

At step 340, for each unique passage, merge the feature vectors from the merged answer vectors for all answers that are associated with this passage via at least one answer-passage pair to obtain (as output) a merged passage-answer vectors for the passage.

At step 350, for each unique passage, concatenate the merged passage vector and the merged passage-answer vector to obtain (as output) a complete passage vector for the passage.

At step 360, produce a ranked list of passages with confidence scores by applying a ranking algorithm to the complete passage vector for each passage.

It is to be noted that the DeepQA architecture [TBD—please note that this sentence fragment was part of the disclosure. If you intended to add to it, please do so to complete the thought or remove it.]. In an embodiment, step

360 can be performed using a model that was trained using statistical machine learning. Such a model is trained prior to running the system.

At step 370, perform an action responsive to the ranked list of passages with confidence scores. For example, in the case where the question relates to a problem with a hardware-based processing device (e.g., computer, media player, phone, tablet, etc.), the system can be configured to automatically (or responsive to a user input) act upon a set of the ranked list of passages (e.g., the top ranked one) to cure the problem. Hence, the action can be a curative action. The action can involve, but is not limited to, executing an antivirus program, locking a door for security purposes (to keep someone in or out of an area), purchase an item, disabling a faulty component, activating a backup component to replace the faulty component, automatically completing a form, and so forth. As is readily appreciated by one of ordinary skill in the art, the preceding actions are merely illustrative and, thus, other actions can be performed depending upon the implementation.

FIG. 4 shows an exemplary method 400 for model training, in accordance with an embodiment of the present invention.

At step 410, gather a large quantity of sample questions.

At step 420, for each sample question, perform steps 310-350 (of method 300 of FIG. 3) to generate passages that each have a complete passage vector.

At step 430, for each passage, obtain ground-truth labels that indicate how good the passage is. In an embodiment, each label can be a numerical score such that a higher score indicates a better passage. It is to be noted that one way to obtain ground-truth labels is to ask human experts to rate the passage on a numerical scale as to whether it provides a useful response to the question. Another way to obtain ground-truth labels is to first gather a set of correct answers to each question and then label each passage as good if it include a correct answer and bad otherwise. Of course, other approaches can also be used, given the teachings of the present invention provided herein, while maintaining the spirit of the present invention.

At step 440, generate a statistical model that ranks feature vectors and assigns confidence scores to those feature vectors in a way that optimally fits the ground-truth labels.

In an embodiment, step 440 can include one or more of steps 440A and 440B that are performed during step 440.

At step 440A, train a classifier on a set of instances, where each instance is a single feature vector (the complete passage vector) and a single label. The output of the classifier is a prediction with a confidence score for that instance. In an embodiment, the classifier can be optimized to minimize loss, where loss is increased by assigning high confidence scores to instances with low labels or low confidence scores to instances with high labels. An example of a classifier that can implement this step is logistic regression. Of course, other types of classifiers can also be used, while maintaining the spirit of the present invention.

At step 440B, train a ranker on a set of sets of instances. The output of the ranker is a ranked list of instances with confidence scores. In an embodiment, the ranker can be optimized to minimize loss where loss is increased by ranking instances with low-relevance labels ahead of instances with high-relevance labels.

An example ranker that can be used implement this step, in one of its life-cycle configurations, works by creating an ensemble of gradient-boosted regression forests based on a minimization of a ranking-sensitive objective function known as a Normalized Discounted Cumulative Gain and then applying this ensemble to assign scores to incoming feature vectors that can be used to rank these vectors. Of course, other rankers can also be used, while maintaining the spirit of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
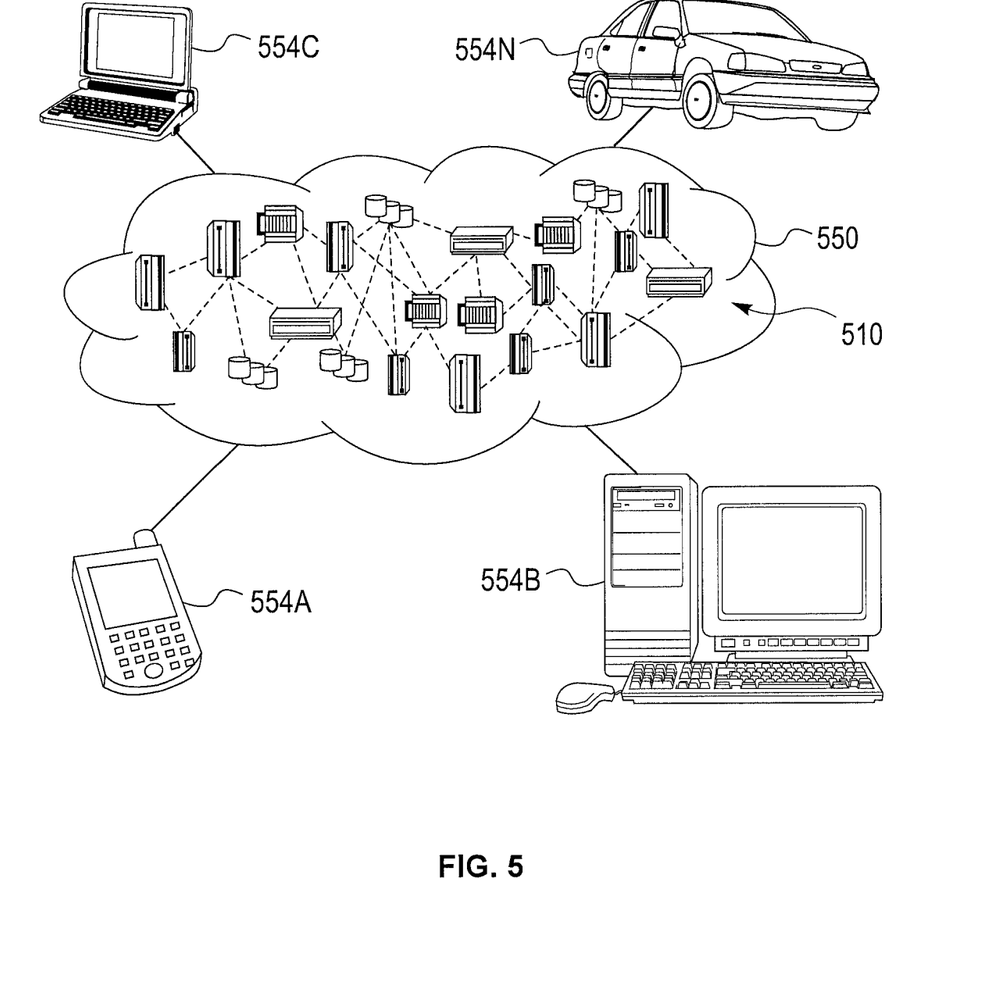
FIG. 5 shows a cloud computing environment, in accordance with an embodiment of the present invention.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
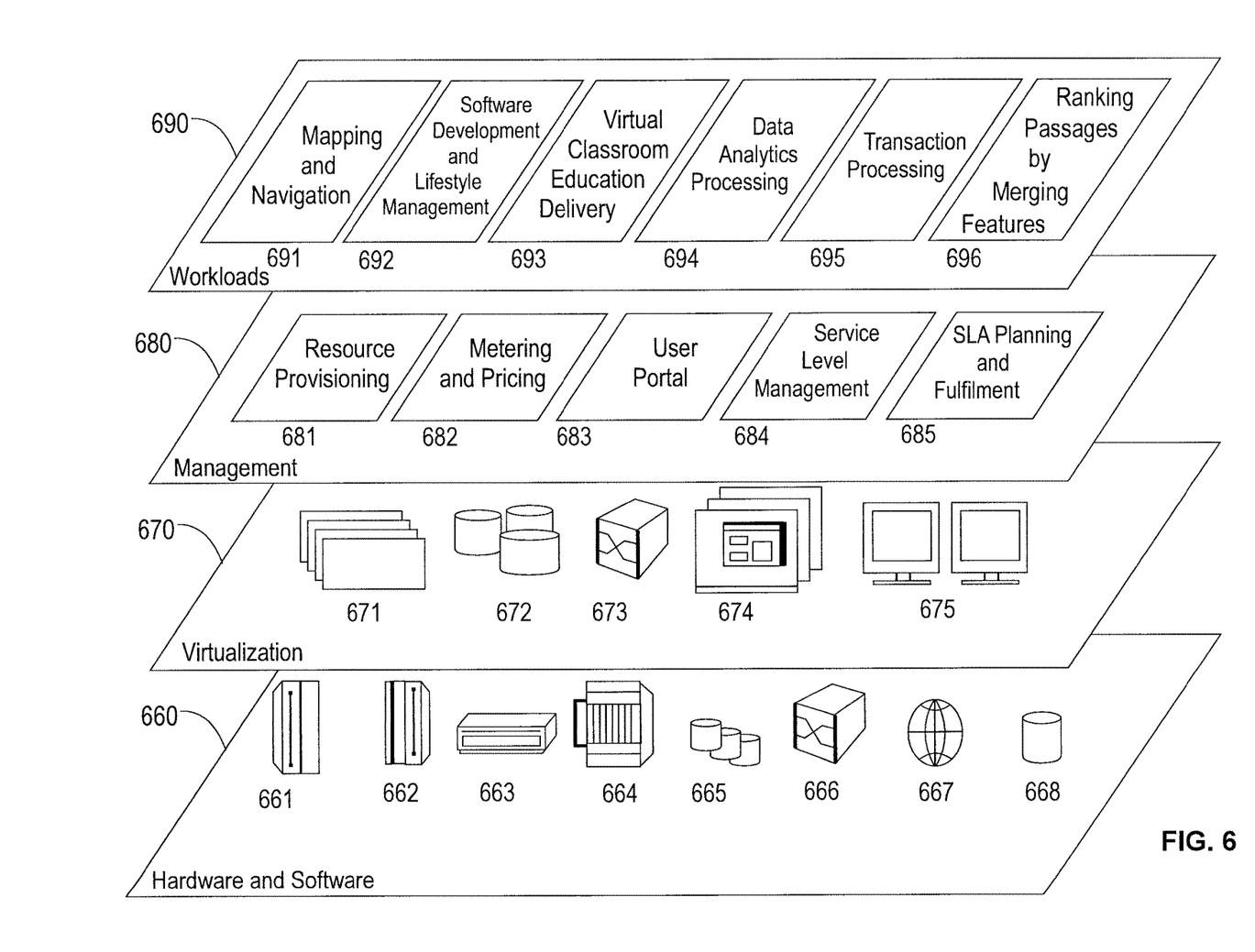
FIG. 6 shows abstraction model layers, in accordance with an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and ranking passages by merging features from factoid questions 696.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method, comprising:
generating, by a processor, a plurality of answer-passage pairs, each associated with a respective one of a plurality of feature vectors;
for each answer in the answer-passage pairs, merging, by the processor, the feature vectors associated with any of the answer-passage pairs that include the answer to obtain a merged answer vector for the answer;
for each passage in the answer-passage pairs, (i) merging, by the processor, the feature vectors associated with any of the answer-passage pairs that includes the passage to obtain a merged passage vector for the passage, (ii) merging, by the processor, the feature vectors from the merged answer vector for each answer that is associated with the passage via at least one of the answer-passage pairs to obtain a merged passage-answer vector for the passage, and (iii) concatenating, by the processor, the merged passage vector and the merged passage-answer vector to obtain a concatenated passage vector for the passage; and
ranking, by the processor, the concatenated passage vector for the each passage to obtain a ranked list of passages with associated confidence scores.

2. The computer-implemented method of claim 1, wherein an answer in at least one of the answer-passage pairs is a factoid answer to a factoid question.

3. The computer-implemented method of claim 1, wherein the plurality of answer-passage pairs are generating by a software architecture for deep content analysis and evidence-based reasoning that uses advanced natural language processing, semantic analysis, information retrieval, automated reasoning and machine learning.

4. The computer-implemented method of claim 1, wherein the feature vectors associated with the any of the answer-passage pairs that includes the answer are merged using one or more pre-defined data merging functions.

5. The computer-implemented method of claim 1, wherein the method is provided as a cloud-based service.

6. The computer-implemented method of claim 1, wherein a highest ranking passage from among the answer-passage pairs relates to a solution for a problem plaguing a hardware-based device, and the method further comprises performing, responsive to the highest ranking passage, a curative action for the problem selected from the group consisting of activating an antivirus program, disabling a faulty component, and activating a backup component to replace the faulty component.

7. The computer-implemented method of claim 1, wherein the concatenated passage vector for the each passage is ranked using a model trained by statistical machine learning.

8. The computer-implemented method of claim 7, wherein the model is trained by:
receiving training questions;
performing the generating, merging, and concatenating steps to generate other passages that each have the complete passage vector;
for each of the other passages, obtain ground-truth labels indicative of a degree to which the each of the other passages answers a corresponding one of the training questions; and
generating the model that ranks the feature vectors and assigns confidence scores to the feature vectors to optimally fit the ground-truth labels.

9. The computer-implemented method of claim 7, wherein the model is generated as a classifier that uses logistic regression.

10. The computer-implemented method of claim 7, wherein the model is configured to minimize loss with respect to instances, each of the instances including a respective single one of the feature vectors and a single passage label having a numerical score, wherein loss is minimized by assigning higher confidence scores to labels with higher numerical scores.

11. A computer program product, the computer program product comprising a non-transitory computer readable storage medium having program instructions embodied therewith, the program instructions executable by a computer to cause the computer to perform a method comprising:
generating, by a processor, a plurality of answer-passage pairs, each associated with a respective one of a plurality of feature vectors;
for each answer in the answer-passage pairs, merging, by the processor, the feature vectors associated with any of the answer-passage pairs that include the answer to obtain a merged answer vector for the answer;
for each passage in the answer-passage pairs, (i) merging, by the processor, the feature vectors associated with any of the answer-passage pairs that includes the passage to obtain a merged passage vector for the passage, (ii) merging, by the processor, the feature vectors from the merged answer vector for each answer that is associated with the passage via at least one of the answer-passage pairs to obtain a merged passage-answer vector for the passage, and (iii) concatenating, by the processor, the merged passage vector and the merged passage-answer vector to obtain a concatenated passage vector for the passage; and
ranking, by the processor, the concatenated passage vector for the each passage to obtain a ranked list of passages with associated confidence scores.

12. The computer program product of claim 11, wherein an answer in at least one of the answer-passage pairs is a factoid answer to a factoid question.

13. The computer program product of claim 11, wherein the plurality of answer-passage pairs are generating by a software architecture for deep content analysis and evidence-based reasoning that uses advanced natural language processing, semantic analysis, information retrieval, automated reasoning and machine learning.

14. The computer program product of claim 11, wherein the feature vectors associated with the any of the answer-passage pairs that includes the answer are merged using one or more pre-defined data merging functions.

15. The computer program product of claim 11, wherein the method is provided as a cloud-based service.

16. The computer program product of claim 11, wherein a highest ranking passage from among the answer-passage pairs relates to a solution for a problem plaguing a hardware-based device, and the method further comprises performing, responsive to the highest ranking passage, a curative action for the problem selected from the group consisting of activating an antivirus program, disabling a faulty component, and activating a backup component to replace the faulty component.

17. The computer program product of claim 11, wherein the concatenated passage vector for the each passage is ranked using a model trained by statistical machine learning.

18. The computer program product of claim 17, wherein the model is trained by:
receiving training questions;
performing the generating, merging, and concatenating steps to generate other passages that each have the complete passage vector;
for each of the other passages, obtain ground-truth labels indicative of a degree to which the each of the other passages answers a corresponding one of the training questions; and
generating the model that ranks the feature vectors and assigns confidence scores to the feature vectors to optimally fit the ground-truth labels.

19. A computer processing system, comprising:
a processor, configured to
generate a plurality of answer-passage pairs, each associated with a respective one of a plurality of feature vectors;
for each answer in the answer-passage pairs, merge the feature vectors associated with any of the answer-passage pairs that include the answer to obtain a merged answer vector for the answer;
for each passage in the answer-passage pairs, (i) merge the feature vectors associated with any of the answer-passage pairs that includes the passage to obtain a merged passage vector for the passage, (ii) merge the feature vectors from the merged answer vector for each answer that is associated with the passage via at least one of the answer-passage pairs to obtain a merged passage-answer vector for the passage, and (iii) concatenate the merged passage vector and the merged passage-answer vector to obtain a concatenated passage vector for the passage; and
rank the concatenated passage vector for the each passage to obtain a ranked list of passages with associated confidence scores.

20. The computer processing system of claim 19, wherein the computer processing system is a cloud-based computer processing system.

* * * * *